HEATING MEANS AND METHOD
Original Filed Aug. 11, 1961
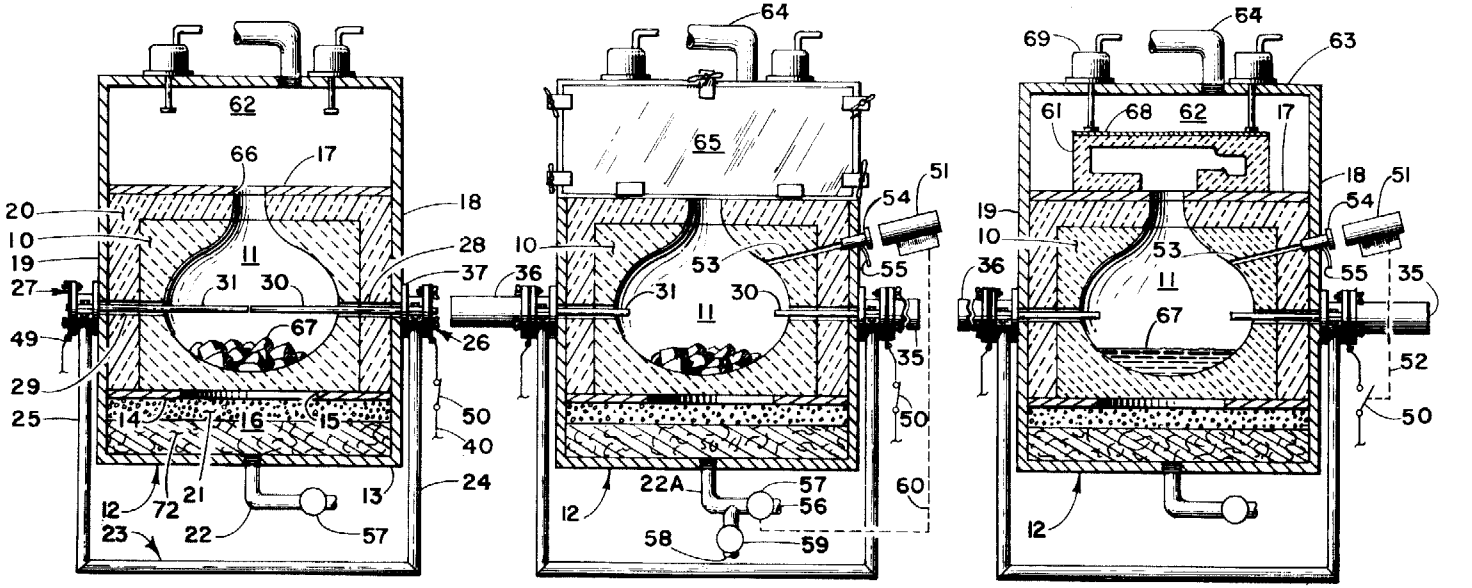
FIG 1
FIG 2
FIG 3
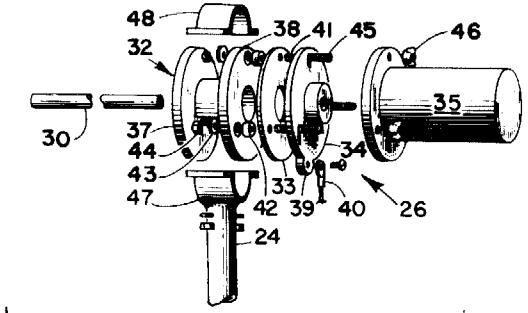
FIG 4
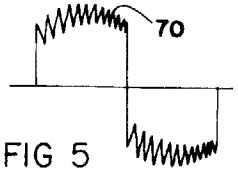
FIG 5
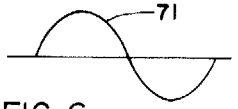
FIG 6
JACK M. BEASLEY
HERBERT GREENEWALD, JR.
INVENTORS
BY H. C. Goldwire
AGENT United States Patent Office Re. 25,958
Reissued Feb. 22, 1966

25,958

HEATING MEANS AND METHOD

Jack M. Beasley, Grand Prairie, Tex., and Herbert Greenewald, Jr., Columbus, Ohio, assignors, by mesne assignments, to Ling-Temco-Vought, Inc., Dallas, Tex., a corporation of Delaware Original No. 3,106,594, dated Oct. 8, 1963, Ser. No. 130,830, Aug. 11, 1961. Application for reissue Mar. 15, 1965, Ser. No. 455,025
11 Claims. (Cl. 13—1)

Matter enclosed in heavy brackets [ ] appears in the original patent but forms no part of this reissue specification; matter printed in italics indicates the additions made by reissue.

This invention relates to methods for electric heating, and more particularly to a method for heating an enclosure with a plasma.

High-temperature electric furnaces have previously fallen into four principal groups when classified according to the method of heating employed. These four groups have included arc furnaces; furnaces employing a solid resistance element; furnaces employing a liquid resistance element; and electron-beam furnaces. All these devices have had certain disadvantages and limitations, and each feature making any one of them attractive for a given, particular utilization is generally offset by attendant and previously unavoidable disadvantages.

Thus, while the current flow to a furnace employing a solid or liquid resistance element is easily stopped and restarted as required to provide the alternate periods of cooling and heating needed for maintaining the furnace interior within a desired temperature range, the solid resistor furnace is limited in operation to the temperature at which the resistor melts or begins to experience serious chemical atack by the atmosphere of the furnace chamber, while a liquid resistor furnace can be heated no further than the temperature at which the liquid resistor vaporizes. While fairly easy to re-start after a period of operation, an electron beam furnace nonetheless presents serious difficulties in temperature control and is operable only under a relatively very high vacuum. Current flow to an arc furnace is easily stopped by opening a switch, but the narrow, ionized zone forming the conducting medium between the electrodes disappears immediately upon cessation of the electrical flow, and the current cannot be restarted simply by closing the switch. Instead, the electrodes must be moved into contact with each other and then separated slightly to draw the arc; or electrical equipment must be supplied which will yield a special starting voltage high enough to provide an initial spark across the electrode gap. Temperature control thus tends to be difficult and unwieldy in an arc furnace.

All the previously employed furnaces have been beset with the disadvantage of large temperature gradients within the furnace chamber which seriously limit furnace efficiency. This problem is especially critical in electron beam furnaces and arc furnaces and is alleviated in a solid resistor furnace only by making the resistor area quite large in relation to the furnace interior and to the electrical power input. Temperature gradients between a liquid resistor and the material to be heated in the furnace are undesirably large except where the material to be heated can be immersed in the liquid or is melted to itself form the liquid resistor. In the case of an arc furnace, all the heat is generated in the small region including the electrode tips and the arc between them, with most of the heat originating in the electrode tips rather than in the arc. As in the case of a solid or a liquid resistor furnace, heat distribution in an arc furnace must be by radiation, convection, and conduction, and the efficiency of heat distribution from the small zone of heat origination in an arc furnace therefore is undesirably low. This undesirability is further aggravated where direct current is employed in an arc furnace, for such operation results in still further localization of the zone of origin of the heat in that the anode tip produces twice as much heat as the cathode.

Further difficulties arising in the operation of arc furnaces are related to the unavoidable occurrence of electrode deterioration. When under D.C. operation of graphite electrodes, vaporized carbon passes from the cathode to the anode and is deposited on the tip of the latter. This carbon "button" interferes with arc propagation and all too frequently falls away from the anode into the furnace charge, into which it enters as a contaminant. In addition, the current density at the electrode tips becomes excessively high under operation with either direct or alternating current, and the resulting high rate of consumption of the electrode material fills the furnace with vapors which contaminate the material heated in the furnace.

It will be evident that it is most desirable to provide a method of operating a furnace yielding advantages of previous furnace operating methods while obviating their disadvantages.

It is, accordingly, a major object of the present invention to provide greatly improved uniformity of temperature within an electric furnace.

Another object is to provide improved ease and efficiency in temperature control of an electric furnace without resort to a solid or liquid resistor element or the necessary utilization of a high vacuum.

A further object is to provide for the attainment of higher temperatures than are possible in a solid or liquid resistor furnace while obtaining improved temperature distribution in the furnace chamber and efficient temperature control without the need for moving the furnace electrodes or employment of special starting voltages.

Yet another object is to provide furnace operation wherein an inert, gaseous plasma fills the furnace chamber and serves as the electrical resistance element.

A still further object is to reduce greatly the deterioration of the electrodes in an electric furnace and the contamination of the furnace contents by vaporized or deposited portions of the electrodes.

Still another object is to provide purging and washing of a melt in a furnace chamber by an inert gas which serves as a plasma resistance element filling the furnace chamber.

Other objects and advantages will be apparent from the specification and claims and from the accompanying drawing illustrative of the invention.

In the drawing:

FIGURE 1 is a front elevation, in central longitudinal section, of a furnace suitable for practice of the present invention, the electrodes being shown in position for preheating the furnace interior;

FIGURE 2 is a view similar to FIGURE 1 but only partially in section to show the gas-tight door of the mold compartment and further showing a modification for effecting temperature control of the furnace, the electrodes being positioned for plasma resistance operation of the furnace;

FIGURE 3 is a view similar to FIGURE 1 and showing a second modification for effecting temperature control, a mold being shown in place to receive the molten metal;

FIGURE 4 is an exploded view of the electrode holder and associated parts;

FIGURE 5 is an oscilloscope trace of the voltage between electrodes during A.C. arc operation; and FIGURE 6 is an oscilloscope trace of the voltage between electrodes during plasma resistance operation.

Briefly described, the invention comprehends the method of heating an enclosure comprising the provision and maintenance in the enclosure of an atmosphere of substantial (for example, at least 15%) argon content. This argon-enriched atmosphere is heated until at least some thermal ionization occurs generally throughout the chamber, whereupon a pair of electrodes are provided in the chamber with a spacing greater than the maximum gap over which, at a given operating potential and in air (or in a cold, argon-enriched atmosphere) an arc could be propagated. When the operating potential is, for example, 40 volts, a convenient and effective spacing of the electrodes is of the order of 6 inches, although a somewhat smaller spacing is not harmful and a larger spacing, where the furnace dimensions permit, is acceptable. The operating potential is applied across the electrode gap to obtain an electrical flow through the ionized material distributed throughout the enclosure, thus utilizing the enriched atmosphere as a resistance element. Temperature control is obtained as more fully described in later paragraphs. The invention further comprises means for carrying out the above method.

With reference to FIGURE 1, the electric furnace comprises a crucible 10 preferably made of a dielectric material or provided with a dielectric lining. The crucible is of porous construction in order to permit the passage of a gas under pressure from its exterior surface, in particular from its bottom, to its interior cavity or chamber 11.

The crucible 10 is contained in a housing 12 with walls and partitions of metal or other heat-resistant material which enclose all the crucible exterior surface in an airtight manner. Spaced slightly above the housing lower wall 13 is a transverse partition 14 upon which the bottom surface of the crucible 10 rests. An opening 15 somewhat smaller than the diameter of the lower surface of the crucible 10 is formed in the partition 14 and is overlapped around all its periphery by the porous surface of the crucible 10, which thus has communication with a plenum chamber 16 enclosed within the housing 12 between the housing lower wall 13 and partition 14. The housing upper side or wall 17 is spaced slightly above the crucible 10 to form therebetween a space which, like the space between the sides of the crucible 10 and the housing side walls 18, 19, is filled with an insulating material 20, preferably a ceramic, which seals off the outer surface of the crucible at its top and sides. Since the lower surface of the crucible 10 is in turn closed off by the housing lower wall 13, the housing 12, including the ceramic insulating material 20, sealingly isolates all the exterior surface of the crucible from the atmosphere. The plenum chamber 16 is filled with a porous or loose insulating material such as spherical, hollow grains of fused alumina 21 followed by an outer layer of rock wool 72. The plenum chamber 16 is connectible with a source of an inert gas, specifically argon, through a tube 22 and thus, in cooperation with the porous crucible 10, is a means for maintaining an increased concentration of argon in the crucible. An opening 66 through the housing upper side 17 and adjoining insulating material 20 communicates with the crucible cavity 11 and permits withdrawal of melted materials from the crucible 10.

The supporting frame 23 includes a pair of vertically extending, fixed members 24, 25 whose upper ends are spaced to either side of the housing 12. A pair of fittings 26, 27 are rigidly mounted on the housing 12, one at each side of the crucible 10, and each fitting 26 or 27 pivotally engages a respective supporting member 24 or 25.

A passage 28 extends axially through the fitting 26 and through the housing wall 18, insulation 20, and crucible 10 into the crucible interior to permit the mounting and variable extension into the crucible chamber 11 of an electrode 30. A second electrode 31 is similarly extensible into the chamber through a similar, second passage 29 at the other fitting 27. The electrodes 30, 31 preferably are of such length that, with their inner ends in contact with each other, their outer ends extend exteriorly of the fittings 26, 27.

FIGURE 4 shows a representative one of the fittings 26, 27, which includes a bearing ring 32, insulating gasket 33, electrode holder 34, and end cap 35. The bearing ring 32 is of tubular construction with spaced, circular end flanges 37, 38. The innermost end flange 37 is rigidly mounted, as shown in FIGURE 1, on the housing, while the other flange 38 is drilled for attachment of the circular electrode holder 34. The latter has a central, tubular portion extending away from the bearing ring 32 and is provided with a lug 39 or equivalent for attachment of the electrical lead 40 through which electrical power is supplied to the associated electrode 30.

The electrode 30 has a snug, sliding fit in the electrode holder 34. The passage 28, where it extends through the bearing ring 32, is of larger diameter than the electrode 30 and the same is true of the portion of the passage 28 extending, as may be seen in FIGURE 1, from the bearing ring 32 into the crucible chamber 11. The electrode, therefore, is spaced from the wall of the passage 28 except at the holder 34, by close sliding contact with which it is afforded support and electrical connection with the lead 40. The spacing of the electrode 30 from the wall of the passage 28 is sufficient to prevent arcing to the bearing ring 32 at operating voltages.

Means electrically isolating the electrode holder 34 of the one fitting 26 or 27 from that of the other include the insulating gasket 33 placed between the bearing ring 32 and electrode holder 34 and insulating bushings 42 between the bearing ring flange 32 and the electrode holder studs 41 which extend through the bearing ring flange 38. Insulating washers 43 are placed between the bearing ring flange 38 and nuts 44 which are run down on the studs 41 to clamp the electrode holder 34 in airtight manner on the bearing ring 32.

A plurality of cap-mounting studs 45 extend outwardly from the face of the electrode holder 34 and engage corresponding openings in a flange of the end cap 35. When wing nuts 46 are tightened down on the studs 45, the end cap 35 is pulled into close, airtight engagement with the electrode holder 34 and encloses the protruding outer end (see FIGURE 1) of the electrode 30. The passages 28, 29, thus may be sealed off, as shown in FIGURE 2, from the atmosphere to permit furnace operation under a partial vacuum. The caps 35, 36 must be long enough to house the electrode outer ends when the electrodes 30, 31 are fully separated, as will be described, for plasma resistance operation.

Each supporting member 24 or 25 terminates at its upper end, as shown in FIGURE 4, in a lower trunnion half 47 which lies between the flanges 37, 38 of and receives the tubular portion of the bearing ring 32. The trunnion upper half 48 is bolted to the trunnion lower half 47 to complete the pivotal mounting of the housing 12 (FIGURE 1) on the two supporting members 24, 25.

The leads 40, 49 are shown for representation of a source of electrical power at a given, desired operating voltage connectible, as described, to the electrodes 30, 31 for supplying the operating potential across the gap between the electrodes. The operating voltage preferably is relatively low, for example 40 to 70 volts, and the amperage accordingly is high. The switch 50 is provided in the lead 40 for making and breaking the electrical connection between the electrodes 30, 31 and the leads 40, 49 extending to the power source.

The modifications shown in FIGURES 2 and 3 include means, such as a radiation or optical pyrometer 51, responsive either to total radiation or to a particular portion of the spectrum of the energy emitted in the hot interior of the crucible 10. In FIGURE 3, the temperature sensing means 51 is connected as by a linkage represented at 52 to the switching means 50 and is responsive for opening the switch 50 when the furnace interior reaches a desired maximum temperature above 2800° F. and for closing the switch 50 when the furnace has cooled to a desired lower limit above 2800° F. In both FIGURES 2 and 3, the pyrometer 51 receives crucible radiations through a vacuum-tight sight hole 53 extending from the crucible cavity 11 to the exterior of the housing 12. A sight glass holder 54 (FIGURE 2) is attached in gas-tight manner in the outer end of the sight hole 53 and a sight glass is sealingly attached on its outer end. A gas, for example argon, is flowed into the sight glass holder 54 near its outer end through an inlet tube 55 to keep furnace vapors swept out of the sight hole 53, thereby preventing clouding of the sight glass.

The modification shown in FIGURE 2 employs a branched tube 22A leading from the plenum chamber 16. One branch 56 leads, as in the other modifications, to the argon supply through a valve 57. The other branch 58 leads through a valve 59 to a supply of a gas other than argon (for example, nitrogen) which may be used to dilute the argon supply in the crucible chamber 11. The pyrometer 51 is connected as at 60 to the argon flow regulating valve 57 to control the argon flow as will be described. Alternatively, the pyrometer 51 may be linked, as will become evident, with the valve 59 controlling the flow of the other gas. Each of the valves 57, 59 thus constitutes a means for varying the concentration of the argon in the crucible chamber 11.

To receive the crucible contents 67, as described later, a mold is placed on the housing upper side 17 as shown in FIGURE 3. Means are provided for reducing atmospheric pressure, during any stage of furnace operation, in the crucible chamber 11 as well as about the mold 61 and at the housing upper side 17. This means includes a compartment 62 containing the mold 61 and formed by a top wall 63 which is associated with the housing top side 17 and extensions of the housing side walls including the walls 18, 19. A tube 64 opening into this compartment 62 leads to a vacuum pump or equivalent (not shown), and the compartment is closed off, when desired, by a gas-tight door 65 (FIGURE 2).

In operation of the furnace for heating to a high temperature the enclosure 11 formed by the crucible 10, an argon-enriched atmosphere is provided and maintained in the crucible. Utilizing the preferred means for accomplishing this step, the valve 57 (FIGURE 1) is opened as required for directing a desired flow of argon through the tube 22 into the plenum chamber 16, from whence it passes through the porous material of the crucible 10 into the crucible interior 11. A pure atmosphere of argon is not essential to plasma resistance operation, and the argon content can be varied widely as long as the minimum concentration required for filling the furnace with a plasma resistor is maintained, a preferred minimum concentration being of the order of 15% argon by weight. While, for reasons which will become apparent, it is preferred to introduce the argon as described, other modes of introducing it are acceptable. As an example, sufficient argon may be flowed into the furnace through the sight hole purging tube 55 (FIGURE 2), through another bore equivalent to the sight hole 53, or through a conduit communicating with one or both the passageways 28, 29 (FIGURE 1) through which the pair of electrodes 30, 31 variably extend into the crucible 10. The setting of the valve 57 is adjusted to obtain and maintain the desired concentration of argon during the remaining operation of the furnace.

A gas, in its normal state, is a very poor conductor of electricity and becomes a conductor only when it contains enough free electrons and ions to serve as carriers for a current. The zone including an ordinary arc between electrodes contains ionized materials which are of significantly high carbon content where graphite electrodes are used and which are kept heated to ionizing temperature in part by resistance heating in the arc but chiefly by the heat emitted by the electrode tips. As the electrodes are more widely separated, a gap is reached which is the maximum gap over which, at a given potential, an arc can be maintained in, for example, air, carbon dioxide, nitrogen, etc. When this gap is exceeded, the arc breaks, for the ionization of the medium between the electrodes becomes insufficient to maintain current flow between them. The maximum gap is relatively small, and an arc cannot readily be maintained over a gap exceeding about one-half inch at 40 volts or one inch at 70 volts, the gap being correspondingly smaller or greater as the voltage is decreased or increased. All the heating thus is localized to the small zone including the extreme tips of the electrodes and the narrow arc between them.

To provide more and other than ordinary arc heating, therefore, the argon-enriched atmosphere in the enclosure 11 provided by the crucible 10 is heated until some of it, generally throughout the enclosure, is thermally ionized. In this manner, the resistance between any two points spaced apart within the crucible atmosphere is reduced, a reduction to the order of 0.01 ohm per inch of spacing being sufficient in representative applications. Satisfactory ionization is obtained by bringing the crucible atmosphere up to or above approximately 2800° F., and this is done in any convenient way resulting in the desired crucible interior temperature. The heating of this atmosphere is effected, for example, by striking an arc between the electrodes 30, 31 with a given, alternating or direct current potential across them and with the electrodes spaced at least slightly less than the maximum spacing at which the arc can be maintained between them, at the given potential, in air or in the cold, argon-enriched atmosphere. The arc is maintained until a temperature of the crucible wall and interior is reached at which thermal ionization occurs in the argon of the crucible atmosphere outside the arc. As measured by an optical pyrometer, this temperature is very near 2800° F.; a temperature of 2775° F., for example is not sufficient.

The argon-enriched atmosphere having been sufficiently heated, it is necessary to provide a pair of electrodes in the enclosure. This will already have been accomplished where, as described, the electrodes 30, 31 are themselves utilized to provide preliminary heating by arc operation. Where the crucible preliminary heating is brought about in another manner, the electrodes 30, 31 nonetheless must be provided, in this case in addition to preliminary heating means. Electrodes 30, 31 of graphite or of tungsten have yielded excellent results. Plasma resistance operation is begun by increasing the spacing of the electrodes 30, 31 to provide a gap greater than the maximum gap over which an arc is propagable in air at the given potential. Ordinarily, the electrode spacing is several times, i.e., at least twice, this maximum spacing, and actually a relatively wide spacing is desired to encourage current flow generally throughout the chamber 11 through the thermally ionized atmosphere filling the same. For example, at an operating potential of 40 volts, a 6-inch spacing between electrodes 30, 31 is entirely feasible and is conducive of good results. A larger gap may readily be employed, for example a gap of 5 inches or more for each 25 volts of operating potential, and maximum gap size is ordinarily limited, under low-voltage, high-amperage operation, only by the dimensions of the crucible chamber 11.

Since the ionized, gaseous resistance element or plasma substantially fills the entire chamber 11, separating the electrodes 30, 31 as described and placing the given, selected voltage across them results not in an ordinary arc but in a much more diffuse flow which occurs throughout the argon-enriched atmosphere in the enclosure 11. Since the flow is diffuse, it will be found that a potential (at least a large fraction of the operating voltage) is placed on a conductive probe placed anywhere in the crucible cavity 11 or even in the outflow of plasma, like a tongue of flame, which ordinarily extends a short distance outside the crucible opening 66. The entire atmosphere in the crucible cavity 11 therefore is conductive. Before reaching a temperature at which plasma-resistance operation is possible, current flow out of the electrodes 30, 31 is only at the electrode tips; current density at the tips therefore is high, and the tips become very hot and decompose with undesirable readiness. When all the atmosphere becomes conductive, current flow is out of all the electrode surfaces (not merely the tip surfaces) within the furnace chamber 11, and current density at the tips of the electrodes 30, 31 is radically lessened, although current flow remains fully as great as during arc operation at the same voltage. Although the furnace temperature increases under plasma operation, electrode tip temperature is markedly decreased and vaporization of the electrodes 30, 31 is radically reduced where not virtually eliminated. Besides the advantages of greatly extended electrode life, carbon vapor contamination or adulteration of the material 67 heated in the furnace is obviated, and even under D.C. operation there is no carbon button built up on the anode and likely to fall into the melt. Most of the heat is generated by passage of the electrical current through the plasma rather than originating at the electrodes 30, 31; hence, this heat is generated throughout the chamber 11 rather than at and immediately between the electrode tips. As a consequence, temperature is comparatively very uniform throughout the furnace chamber 11 and there is little if any reliance on conduction, radiation, and convection for reducing temperature gradients within the crucible 10. It is of interest that the current flow through the plasma resistor differs in kind from that through an arc. As shown in FIGURE 5, the flow through electrodes separated by a gap spanned by an arc, an A.C. flow being shown by way of example, results in or is accompanied by sharp voltage fluctuations (voltage across the electrodes being shown by the line 70) which greatly vary the wave-form of the power supply voltage, in this case a sine wave. FIGURE 6 shows the voltage across electrodes to which an A.C. current is fed during plasma resistance operation. Without entering into discussion of the causes of the rapid and violent variations of voltage during arc operation, it will be noted that the voltage during plasma resistance operation follows the pure sine wave of the power source. The plasma behaves, therefore, purely as a resistor of constant value. The arc flow is of another kind and nature, as evidenced by the voltage fluctuations.

The plasma resistor, resulting from ionization within an atmosphere enriched with one of the noble, inert gases, offers none of the problems presented by other resistors. The plasma is entirely compatible with all materials which may be employed in constructing the furnace or heater in the same; it does not chemically attack other materials, nor is it itself oxidized or otherwise affected by air. In fluid state, it is not adversely affected by further increase in temperature above 2800° F. and hence is not subject to a melting or vaporization such as that which, in furnaces employing a solid or liquid resistor, limits the upper range of operating temperature. There are no resistor maintenance problems, it being ncessary only to ensure an adequate concentration of the plasma-producing gas in the crucible. Operating pressures are in no way critical, as in an electron beam furnace: the plasma resistor has been operated efficiently from pressures above atmospheric down to pressures as low as 0.03 mm. of mercury.

Furthermore, it is important to note that the argon serves not only to provide the plasma for heating, it also protects the furnace interior and its contents from reaction with atmospheric gases and furthermore serves the important and valuable function, entering the chamber as it does through the porous crucible material at the bottom of the crucible chamber, building up through the heated material 67 and scrubbing the same of impurities when it is melted as in FIGURE 3.

Whereas an arc furnace is limited to the maximum temperature attainable at the heated material by heat brought to the latter, from the arc zone, by conduction, convection, and radiation, no such limitation exists when heating with the plasma resistor, for heating occurs throughout the furnace cavity. The furnace operating temperature therefore is limited only by the ability of the crucible material to withstand melting. Meanwhile, it will be seen that temperature control when using the plasma resistance element is more effective and more easily attained than in arc and electron beam furnaces and is comparable with temperature control in solid and liquid resistor furnaces.

According to a preferred feature of the method of operating an electric furnace whereby the furnace interior 11 is maintained within a desired temperature range whose upper and lower limits lie above 2800° F., the current flow through the electrodes 30, 31 and plasma is interrupted when the temperature of the furnace interior reaches the desired upper limit. This is readily accomplished by opening the switch 50.

The furnace is then allowed to cool for a period of time sufficient for its temperature to be reduced to the desired lower limit. At this time, while maintaining the above-described electrode spacing for plasma resistor operation, the given operating voltage is again applied across the electrodes 30, 31 to resume the current flow. Closure of the switch 50 is sufficient to effect this flow, for while the furnace interior 11 remains above 2800° F., the argon-enriched atmosphere within the furnace remains conductive and current flow commences immediately upon placing the operating voltage across the electrodes. There is no need, as in ordinary arc furnace operation, for touching the electrodes 30, 31 together or for added equipment for providing a high-voltage starting spark between spaced electrodes. The sole requisite for operation, as above described, for controlling temperature within the electric furnace is that the current flow be resumed before the argon-enriched atmosphere in the furnace interior has cooled below 2800° F., for upon passing below this temperature the crucible atmosphere is no longer sufficiently ionized to re-start the flow without resort to touching the electrodes 30, 31 together or reducing their spacing to an ordinary arc gap and employing a high, special starting voltage.

Temperature within the electric furnace also is effectively controlled by increasing the argon content of the crucible atmosphere to raise the crucible temperature and decreasing the argon content to lower the temperature. While the crucible 10 is operating, for example, with the crucible opening 66 exposed to the atmosphere, relatively cool and hence heavy air outside the crucible tends to flow down through the opening 66 and thus to dilute the argon-enriched atmosphere in the crucible. A given, constant flow of argon into the crucible through the tube 22 or 22A therefore will tend to result in an equilibrium being reached at which the argon content in the crucible 10 is relatively constant. Adjusting the valve 57 to provide a greater argon flow further enriches the crucible atmosphere and concurrently raises its conductivity. The resulting increase in amperage of the current passing through the crucible atmosphere, voltage being held constant, increases the rate of evolution of heat. Dilution of the crucible atmosphere with air or other gases increases its resistance and diminishes the current flow, thereby lowering the furnace temperature. The argon content must not be lowered so greatly as to lose the plasma resistance mode of operation, and it has been found that this operation is still well retained when the argon content has dropped to 15%. By the same token, the temperature reduction cannot proceed below 2800° F., for the plasma resistance operation will be lost below this temperature.

Automatic temperature control is obtained by operation of the modification shown in FIGURE 3. The temperature sensing means, for example the optical pyrometer 51, senses the temperature within the crucible 10 through the sight hole 53 and responds to occurrence of the maximum desired temperature by opening the switch 50 by actuating the linkage 52. In response to the furnace temperature having fallen to the desired lower limit, the temperature sensing means actuates the linkage to close the switch and thus to re-start the current flow.

In the modification shown in FIGURE 2, the temperature sensing means responds to temperatures within the crucible chamber to open and close the argon flow control valve 57 through the linkage 60, the valve being more widely opened to increase argon flow when the furnace temperature falls below a desired value and closed to decrease argon flow when the furnace temperature becomes excessive. Alternatively, the linkage 60 can be connected to the valve 59 in the branch 58, whereupon the argon flow is set manually to a constant value and the argon concentration in the crucible varied by action of the sensing means 51 on the second valve 59. The second valve 59 is opened to admit a gas other than argon (for example, nitrogen) through the branch 58 and thus to dilute the argon flow into the crucible chamber 11. The dilution results in a lessened current flow and lowered temperature. The dilution must not be excessive, for too much nitrogen, air, carbon dioxide, etc. will so reduce the argon concentration and increase the resistance of the crucible atmosphere as to result in abrupt loss of plasma resistance operation. Closing the valve 59 permits the argon concentration to rise and thus raises the temperature in the crucible 10.

Whenever operation of the furnace under a partial vacuum is desired, the mold compartment 62 is rendered airtight by closing the door 65 (FIGURE 2). The caps 35, 36 are sealingly mounted on the electrode holders at the fittings 26, 27 to prevent the inflow of air around the electrodes 30, 31 and the compartment 62 and crucible chamber 11 are evacuated, to the extent desired, by connecting the tube 64 to a vacuum pump or equivalent. According to one frequently employed sequence of operations, the metal 67 (FIGURE 1) or other material to be heated is introduced into the furnace and melted at atmospheric pressure with, of course, argon enrichment. The mold 61 (FIGURE 3) then is placed on the housing upper side 17 and in register with the crucible pouring hole 66. A support plate 68 is placed on top of the mold 61, and the mold is clamped in place by fastening means such as a pair of air-driven actuators 69 whose piston rods are extensible, upon air being supplied to the actuators, into engagement with the support plate. The door 65 (FIGURE 2) is put in place to render the mold compartment 62 (FIGURE 3) airtight, and the compartment 62 and crucible chamber 11 are evacuated through tube 64. After further heating of the melt 67, where desired, the housing 12 is rotated 180 degrees on the supporting members 24, 25, thereby pouring the liquid metal 67 (FIGURE 3) into the cavity of the mold 61. After the metal has solidified, the furnace is rotated back to its original position. After introducing argon to return the crucible chamber 11 to atmospheric pressure, the gas-tight door 65 is opened and the mold is removed from the compartment.

While only certain particular embodiments and modifications of the invention have been described herein and shown in the accompanying drawing, it will be evident that further modifications are possible without departing from the scope of the invention.

We claim:

1. The method of heating an enclosure comprising:

providing and maintaining in the enclosure at atmosphere of at least 15% argon content;

heating substantially all the atmosphere in the enclosure to a temperature at which some of the argon of said atmosphere is thermally ionized throughout the enclosure;

providing a pair of electrodes in the enclosure and spacing them apart to provide between them a gap greater than the maximum gap over which an arc is propagable between the electrodes in air at a given potential;

and applying said given potential across the gap to obtain a flow of electrical current through the atmosphere in the enclosure.

2. The method of heating an enclosure comprising:

providing and maintaining an argon-enriched atmosphere in the enclosure;

heating the atmosphere in the enclosure to a temperature at which the electrical resistance of the atmosphere is lowered to the order of 0.01 ohm per inch between spaced points substantially anywhere in the atmosphere by ionization of argon of the atmosphere;

providing a pair of electrodes in the enclosure spaced to provide a gap between them greater than the maximum gap capable of supporting an arc between the electrodes in air at a given potential;

and applying said given potential across the electrode gap to obtain a diffuse flow of electrical current through the argon-enriched atmosphere in the enclosure.

3. The method of operating an electric furnace having a crucible and a pair of electrodes variably extensible into the crucible, said method comprising:

providing and maintaining in the crucible an atmosphere of at least 15% argon content;

placing a given potential across the electrodes and providing an arc between them by spacing them at a given spacing less than the maximum spacing at which, at the given potential, an arc can be maintained between them before the atmosphere in the crucible is heated;

heating the crucible by maintaining said arc until the crucible interior reaches a temperature at which ionization occurs in the argon of said atmosphere well outside the arc;

and increasing the spacing between the electrodes beyond said maximum spacing.

4. The method of operating an electric furnace having a dielectric crucible, said method comprising:

providing a pair of electrodes made of a material selected from the group including carbon and tungsten and variably extensible into the crucible;

maintaining in the crucible an atmosphere of at least 15% argon content;

providing an arc between the electrodes by placing a given, alternating potential across the electrodes and spacing them at a given spacing no greater than the maximum spacing at which an arc can be maintained between them, at the given potential, before the atmosphere in the crucible is heated;

heating the crucible and its contents by maintaining said arc until a temperature is attained at which ionization occurs well outside the arc in the argon of the atmosphere in the crucible;

and increasing the spacing between the electrodes to a spacing which exceeds twice said maximum spacing.

5. The method of operating an electric furnace comprising:

providing and maintaining in the furnace an argon-enriched atmosphere;

heating the furnace interior and substantially all the argon-enriched atmosphere to a temperature in excess of 2800° F.;

providing a pair of electrodes in the furnace spaced by a gap of more than 5 inches;

and passing a flow of electrical current through the argon-enriched atmosphere by applying a power source with a potential of less than 200 volts across the gap between the electrodes.

6. The method of maintaining the interior of an electric furnace within a desired temperature range having an upper and a lower limit both above 2800° F., said method comprising:

maintaining an argon-enriched atmosphere in the furnace;

providing in the furnace a pair of electrodes;

heating the furnace interior in excess of 2800° F.;

passing a flow of electrical current through the argon-enriched atmosphere by applying a given potential across the electrodes with the electrodes spaced a given spacing which is a plurality of times the spacing across which an arc can be maintained at the given voltage in air;

interrupting the current flow through the argon-enriched atmosphere when the furnace interior reaches the upper limit of the temperature range;

and leaving the electrodes spaced at said given spacing and applying said given voltage across them to resume the flow of electrical current through the argon-enriched atmosphere before the furnace interior has cooled to the lower limit of the temperature range.

7. The method of controlling the temperature within an electric furnace having variably spaceable electrodes comprising:

heating the furnace interior above 2800° F. by striking an arc between the electrodes;

maintaining an argon-enriched atmosphere in the furnace;

spacing the electrodes to provide between them a gap which is a plurality of times the maximum gap at which an arc is sustainable between the electrodes in air at a given potential;

passing a flow of electrical current through the argon-enriched atmosphere by imposing said given potential across the electrodes;

and increasing the argon content in the furnace atmosphere to raise the temperature within the furnace and decreasing the argon content in the furnace atmosphere to lower the temperature within the furnace.

8. The method of operating an electric furnace having a dielectric crucible and a pair of electrodes variably extensible into the crucible, said method comprising:

maintaining an argon-enriched atmosphere in the crucible;

heating the crucible interior, including the argon-enriched atmosphere, above 2800° F.;

and passing an electrical current through the argon-enriched atmosphere at a given potential with the electrodes separated by a gap of at least one inch for each 25 volts of said potential.

9. The method set forth in claim 8 and further comprising:

cutting off the electrical current flow through the argon-enriched atmosphere when the furnace temperature reaches a desired upper limit above 2800° F.; and maintaining said electrode gap and resuming the current flow through the argon-enriched atmosphere by applying said given potential across the gap when the furnace temperature has fallen to a desired lower limit above 2800° F.

*10. The method of heating an enclosure comprising:*

*providing and maintaining in the enclosure an atmosphere enriched with a noble gas;*

*heating the atmosphere in the enclosure to a temperature at which substantial ionization occurs in the noble gas throughout the enclosure;*

*positioning a pair of electrodes in the enclosure and spacing them apart to provide between them a gap greater than the maximum gap capable of supporting an arc between the electrodes in air at a given potential;*

*and applying said potential across the electrode gap to obtain a diffuse flow of electrical current through the ionized, noble gas enriched atmosphere in the enclosure.*

*11. The method of heating an enclosure containing an atmosphere, said method comprising:*

*enriching the atmosphere contained within the enclosure with a noble gas;*

*heating the enclosure interior until substantial ionization has occurred substantially throughout the enclosure interior in the noble gas enriching the enclosure atmosphere;*

*positioning in the enclosure a pair of electrodes;*

*and passing a diffuse flow of electrical current through the ionized, enriched atmosphere by applying a given potential across the electrodes with the electrodes spaced a given spacing which is a plurality of times the spacing across which an arc can be maintained at the given voltage in air.*

References Cited by the Examiner

The following references, cited by the Examiner, are of record in the patented file of this patent or the original patent.

UNITED STATES PATENTS

| | | | |
|---|---|---|---|
| 1,310,079 | 7/1919 | Hechenbleikner | 13—9 |
| 1,499,922 | 7/1924 | Hadaway | 13—9 |
| 2,147,070 | 2/1939 | Weinheimer | 13—34 |
| 2,285,837 | 6/1942 | Ridgway | 13—34 |
| 2,726,278 | 12/1955 | Southern | 13—9 |
| 2,782,245 | 2/1957 | Preston | 13—9 |
| 3,004,137 | 10/1961 | Karlovitz | 219—75 |

FOREIGN PATENTS

| | | |
|---|---|---|
| 152,176 | 10/1920 | Great Britain. |

RICHARD M. WOOD, *Primary Examiner.*

JOSEPH V. TRUHE, *Examiner.*